United States Patent [19]

Iio

[11] Patent Number: 4,767,225

[45] Date of Patent: Aug. 30, 1988

[54] THRUST BEARING HOLDING STRUCTURE FOR OUTBOARD MOTORS

[75] Inventor: Takeshi Iio, Hamamatsu, Japan

[73] Assignee: Yamaha Hatsudoki Kabushiki Kaisha, Iwata, Japan

[21] Appl. No.: 611,384

[22] Filed: May 17, 1984

Related U.S. Application Data

[63] Continuation of Ser. No. 432,811, Oct. 5, 1982, abandoned.

[30] Foreign Application Priority Data

Oct. 30, 1981 [JP] Japan ................................ 56-172834

[51] Int. Cl.⁴ .............................................. F16C 19/10
[52] U.S. Cl. .................................... 384/616; 384/620; 384/626
[58] Field of Search .............. 308/231, 244, 234, 227, 308/230; 384/616, 620, 626

[56] References Cited

U.S. PATENT DOCUMENTS

| | | | |
|---|---|---|---|
| 2,094,945 | 10/1937 | Hesselrode | 308/231 |
| 3,838,953 | 10/1974 | Peterson | 308/231 |
| 4,353,606 | 10/1982 | Bitsch et al. | 308/244 |

*Primary Examiner*—Lenard A. Footland
*Attorney, Agent, or Firm*—Harness, Dickey & Pierce

[57] ABSTRACT

An improved thrust bearing arrangement for locating the drive shaft of a marine drive. In accordance with the invention, the thrust bearing is fixedly supported between the lower unit and a supporting housing and the location of the drive shaft is controlled by a shim that is positioned between a flange on the drive shaft and the inner race of the thrust bearing.

4 Claims, 3 Drawing Sheets

THRUST BEARING HOLDING STRUCTURE FOR OUTBOARD MOTORS

This application is a continuation of application Ser. No. 432,811, filed 10/5/82.

BACKGROUND OF THE INVENTION

This invention relates to a thrust bearing holding structure for outboard motors and more particularly to an improved thrust bearing arrangement for the drive shaft of a marine drive.

In outboard motors or the like, it has been a common practice to provide a thrust bearing in the lower unit for supporting the drive shaft and for taking the thrust on the drive shaft generated by the final drive. Such thrust bearings are normally supported at the upper end of the lower unit and have the outer race of the bearing positioned between the lower unit housing and a supporting housing such as the water pump housing. The inner race of the bearing is supported on a flange formed integrally with the drive shaft. Axial positioning of the drive shaft and the drive pinion supported by it is accomplished by means of shims positioned beneath the outer race of the thrust bearing. As a result, it has been necessary to provide additional shims on the upper side of the outer race of the thrust bearing so that the pump housing will always be located in a uniform position regardless of the size of the shim positioned beneath the outer race. Of course, such an arrangement gives rise to a complicated construction and the use of multiple shims which can give rise to difficulties both during assembly and during repair.

It is, therefore, a principal object of this invention to provide an improved thrust bearing arrangement for the final drive of an outboard motor.

It is a further object of this invention to provide an improved and simplified thrust bearing and shaft locating arrangement for the drive shaft of a marine drive.

SUMMARY OF THE INVENTION

This invention is adapted to be used in a thrust bearing arrangement for a drive shaft of a marine drive that includes a lower housing through which the drive shaft passes and a support housing that is affixed to the lower housing. The drive shaft has a flange and a thrust bearing is employed having an inner race received around the drive shaft in proximity to the flange and an outer race. In accordance with the invention, the outer race is supported between the lower housing and the supporting housing and shim means are interposed between the inner race and the drive shaft flange for axially locating the drive shaft relative to the lower housing.

PRIOR ART CONSTRUCTION

Figure 1:
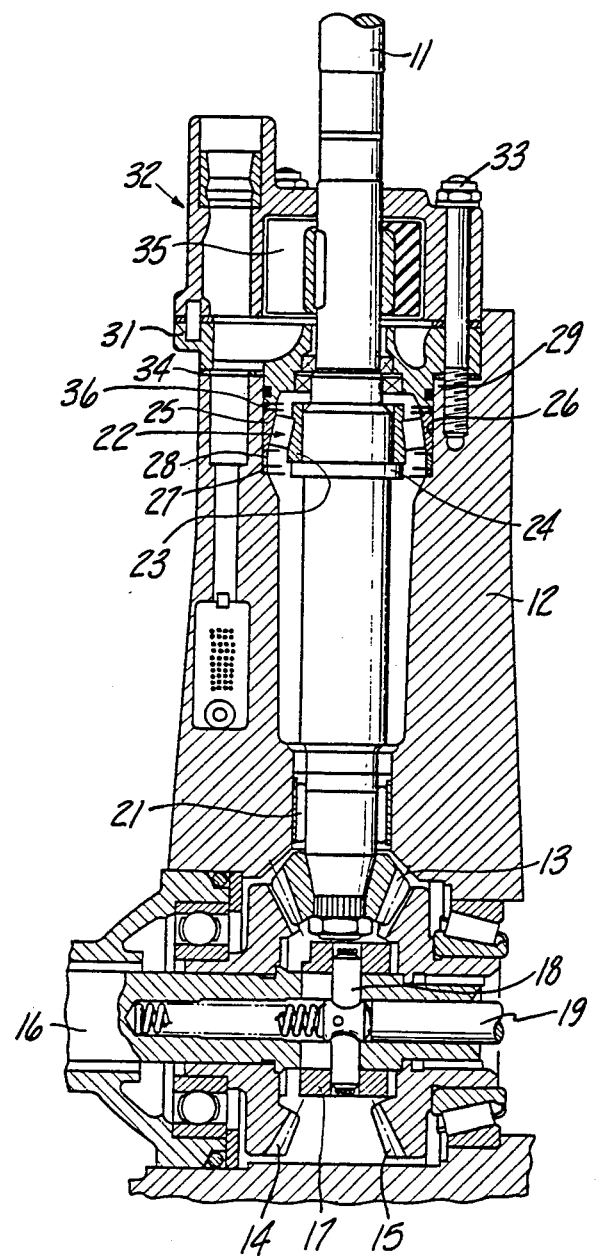
FIG. 1 is a cross-sectional view taken through the lower unit of an outboard motor having a drive shaft thrust bearing construction in accordance with the prior art.

FIG. 1 is a cross-sectional view taken along the axis of the drive shaft of the lower unit of an outboard motor employing a thrust bearing arrangement of the type employed in the prior art. In this figure, the drive shaft is indicated generally by the reference numeral 11 and extends through an opening in the lower housing, indicated generally by the reference numeral 12. The drive shaft 11 carries a bevel gear 13 at its lower end which meshes with a pair of bevel gears 14 and 15 that are journaled on a propeller shaft 16 which drives a propeller (not shown) in a suitable manner. A dog clutching member 17 is affixed for rotation with the propeller shaft 16 by means of a cross pin 18. As is well known in the art, the dog clutch 17 may be axially positioned by means of a control member 19 so as to engage the dog clutching member 17 with corresponding teeth formed on either of the gears 14 and 15. In the figure, the clutching member 17 is shown engaged with the gear 15 so as to drive the propeller shaft 16 in a forward direction.

Radial loads on the lower end of the drive shaft 11 are taken by means of a needle bearing assembly 21 that is supported at the lower portion of the lower unit 12 in proximity to the bevel gear 13. The bevel gear 13 exerts an upward thrust on the drive shaft 11 and this thrust is taken by a combined thrust and radial bearing, indicated generally by the reference numeral 22. The bearing 22 includes an inner race 23 that is supported directly upon a flange 24 formed integrally with the drive shaft 11. An outer bearing race 25 is positioned within a cylindrical recess 26 formed in the upper end of the lower unit 12.

In order to insure correct meshing between the gear 13 and the gears 14 and 15, it is necessary to accurately position the drive shaft 11. In accordance with the prior art constructions, this has been accommplished by providing a accurately sized shim 27 between a shoulder at the base of the bore 26 and beneath the bearing outer race 25. The outer race 25 is supported on the shim 27 by means of a spacer member 28. The outer race 25 is held in position by a nose section 29 of the lower plate 31 of a water pump assembly, indicated generally by the reference numeral 32. The water pump assembly 32 is affixed to the lower unit 12 by means of a plurality of bolts 33. A gasket 34 is interposed between the pump end plate 31 and the lower unit 12. A vane 35 of the water pump 32 is affixed to the drive shaft housing 11 in a cavity defined by the pump housing units for delivering pressurized water to the associated engine.

With the prior art type of thrust bearing arrangements, the outer race 25 is positioned at a variable height in the housing 12 depending upon the thickness of the shim 27. Therefore, to prevent changes in location of the water pump housing 32 in response to the use of different size shims 27, it has been necessary to employ a further shim 36 on the upper side of the outer race 25 below the nose piece 29 of the water pump end plate 31. The shim 36 is adjusted in thickness so as to maintain a constant height or location for the water pump 32 regardless of the size of the shim 27 employed. Such arrangements obviously become unduly complicated and add to cost and give rise to problems upon assembly and subsequent reassembly after servicing. It is to overcome these problems that the present invention is employed.

DETAILED DESCRIPTION OF THE PREFERRED EMBODIMENT

Figure 2:
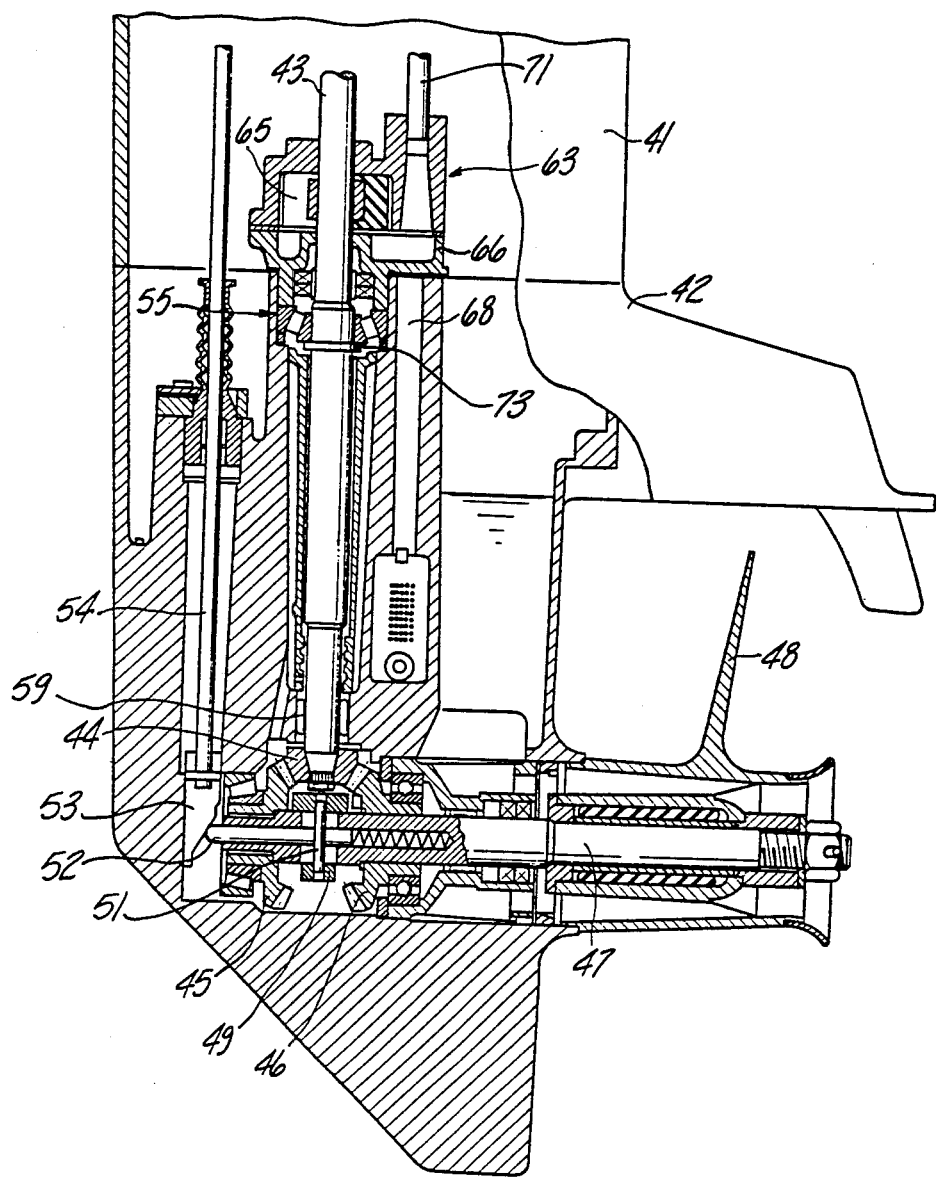
FIG. 2 is a side elevational view of the lower unit of an outboard motor constructed in accordance with this invention with portions shown in section.
Figure 3:
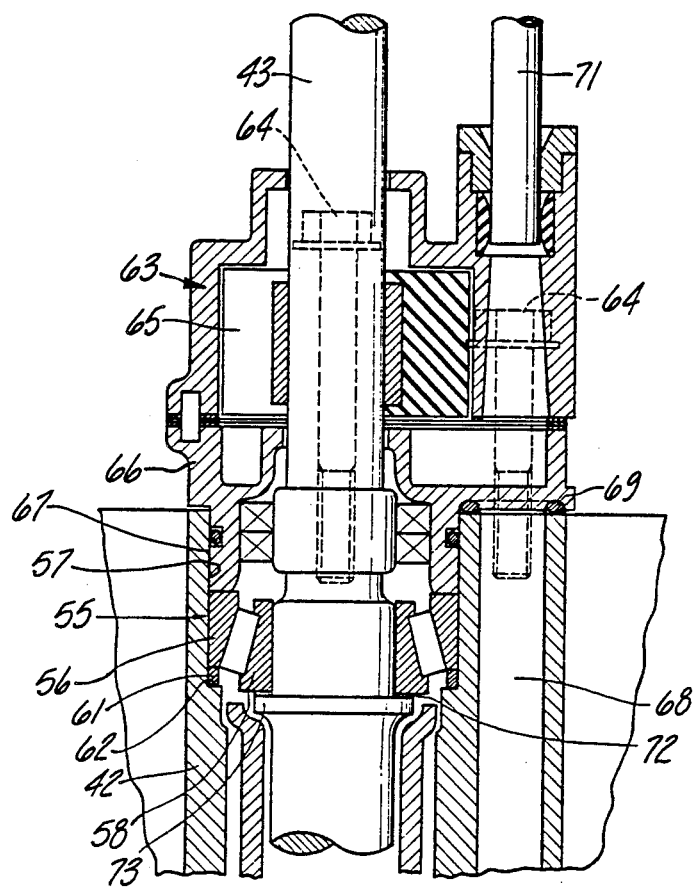
FIG. 3 is an enlarged cross-sectional view of the thrust bearing arrangement employed in the lower unit of FIG. 2.

Referring now to FIGS. 2 and 3 and first primarily to FIG. 2, the lower portion of an outboard motor constructed in accordance with this invention is illustrated, partially in cross-section. The motor includes a drive shaft housing 41 and lower unit 42 that are secured together in a known manner. A drive shaft 43 extends vertically through the drive shaft housing 41 and into an appropriate opening in the lower unit 42. A bevel gear 44 is affixed to the lower end of the drive shaft 43 within the lower unit 42. The bevel gear 44 meshes with a pair of bevel gears 45 and 46 that are journaled on a propeller shaft 47 to which a propeller 48 is affixed in a known manner.

A dog clutching element 49 is positioned between the gears 45 and 46 and has clutching jaws that are adapted to be engaged with either of the gears 45 and 46 so as to drive the propeller 48 in either a forward or reverse direction. In addition, the clutching element 49 may be positioned in a neutral location so that neither of the gears 45 and 46 are engaged. The clutch 49 is keyed to the propeller shaft 47 by means of a pin 51. The pin 51 may be moved axially to engage the clutching element 49 with either the gears 45 and 46 by means of a control pin 52 and actuating cam 53 that is connected to an operating lever 54.

The radial loads on the lower end of the drive shaft 43 are taken by a needle bearing assembly 59 that is supported in the lower unit 42 in juxtaposition to the bevel gear 44.

Referring now additional to FIG. 3, a thrust bearing arrangement, indicated generally by the reference numeral 55 is provided for supporting the intermediate portion of the drive shaft 43 and for taking the axial thrust exerted by the bevel gear 44 on the drive shaft 43. The thrust bearing 55 includes an outer race 56 that is positioned in a recess 57 formed at the upper end of the lower unit 42 around the opening that passes the drive shaft 43. The bearing 55 also includes an inner race 58 that is received upon the drive shaft 43.

In accordance with the invention, the outer race 56 is supported at a fixed position within the lower unit 42 by means of a collar or spacer 61 that is engaged with a shoulder 62 formed at the lower end of the bore 57 and upon which the outer race 56 is supported. A water pump assembly, indicated generally by the reference numeral 63 is supported upon the lower unit 42 by means of bolts 64. The water pump assembly 63 includes a main body portion in which a vane 65 is positioned that is keyed for rotation with the drive shaft 43. The main pump housing is closed by a lower plate 66 that has a nose piece 67 that extends into the lower unit bore 57 and which engages the upper side of the outer race 56 so as to lock the bearing 55 in axial position relative to the lower unit 42.

The water pump 63 draws water from the body in which the unit is operating through an inlet passage 68. The inlet passage 68 cooperates with an inlet opening to the water pump through the end plate 66. A simple O-ring seal 69 is all that is required to seal between the lower unit 42 and the pump end plate 66 in accordance with this arrangement. The water pressurized by the vane 65 is delivered to the cooling system of the engine via a delivery pipe 71 that is suitably received in the pump housing.

With the described arrangement, the outer race 56 is positioned at a constant location in the lower unit 42. Axial positioning of the drive shaft 43 and adjustment of the lash between the gear 44 and the gears 45 and 46 is controlled by a shim 72 that is disposed between the lower end of the inner race 58 and an integral flange 73 of the drive shaft 43. Thus, only one shim need be employed so as to axially position the drive shaft 43 and gear 44 and no shims are necessary to adjust the position of the water pump 63 relative to the lower unit 42. Therefore, it should be readily apparent that this construction is considerably simpler than the prior art and is likely to cause less difficulties during assembly and servicing.

It is to be understood that the foregoing description is that of a preferred embodiment of the invention and that various changes and modifications may be made without departing from the spirit and scope of the invention, as defined by the appended claims.

I claim:

1. In a marine outboard drive, a lower housing, a drive shaft driven by an associated engine and passing through said lower housing, a housing containing a driven element affixed to said lower housing, said driven element being driven by said drive shaft, a propeller shaft journaled in said lower housing and driven by said drive shaft, said drive shaft having a flange formed thereon, and a thrust bearing having an inner race received around said drive shaft in proximity to said flange and an outer race, the improvement comprising said outer race being supported between said lower housing and said housing containing said driven element and shim means interposed between said inner race and said flange for axially locating said drive shaft relative to said lower housing.

2. In a marine outboard drive as set forth in claim 1 wherein the means for driving the propeller shaft includes a driving pinion affixed to the drive shaft.

3. In a marine outboard drive as set forth in claim 2 wherein the lower housing is formed with a bore surrounding an opening through which the drive shaft passes and formed at the upper end of said lower housing, said outer race being supported in said bore and said housing containing said driven element having a nose piece projecting into said bore for supporting said outer race.

4. In a marine outboard drive as set forth in claim 3 wherein the housing comprises a water pump housing and the driven element comprises a pumping element.

* * * * *